(12) United States Patent
Watanabe

(10) Patent No.: US 9,132,800 B2
(45) Date of Patent: Sep. 15, 2015

(54) VEHICLE SEAT

(75) Inventor: Masato Watanabe, Tochigi (JP)

(73) Assignee: TS TECH CO., LTD., Asaka-Shi (JP)

( * ) Notice: Subject to any disclaimer, the term of this patent is extended or adjusted under 35 U.S.C. 154(b) by 145 days.

(21) Appl. No.: 13/877,147

(22) PCT Filed: Sep. 27, 2011

(86) PCT No.: PCT/JP2011/072074
§ 371 (c)(1),
(2), (4) Date: Mar. 29, 2013

(87) PCT Pub. No.: WO2012/043560
PCT Pub. Date: Apr. 5, 2012

(65) Prior Publication Data
US 2013/0187430 A1    Jul. 25, 2013

(30) Foreign Application Priority Data

Sep. 30, 2010 (JP) ................................ 2010-222061

(51) Int. Cl.
B60N 2/68 (2006.01)
B60R 22/26 (2006.01)
B60R 22/28 (2006.01)

(52) U.S. Cl.
CPC . *B60R 22/26* (2013.01); *B60N 2/68* (2013.01); *B60N 2/682* (2013.01); *B60N 2/688* (2013.01)

(58) Field of Classification Search
USPC ........................ 297/452.18, 452.19
See application file for complete search history.

(56) References Cited

U.S. PATENT DOCUMENTS

| 8,132,862 | B2* | 3/2012 | Yamada et al. | 297/452.2 |
| 8,459,747 | B2* | 6/2013 | Watanabe | 297/452.2 |
| 2003/0098601 | A1* | 5/2003 | Minai | 297/452.19 |
| 2006/0049682 | A1* | 3/2006 | Yamanaka | 297/452.18 |
| 2007/0096533 | A1* | 5/2007 | Min | 297/452.18 |
| 2007/0145807 | A1* | 6/2007 | Gundall et al. | 297/452.18 |
| 2010/0187893 | A1* | 7/2010 | Yamada et al. | 297/452.18 |

(Continued)

FOREIGN PATENT DOCUMENTS

| JP | 58-65950 U | 5/1983 |
| JP | 04-303034 A | 10/1992 |

(Continued)

OTHER PUBLICATIONS

Office Action issued for JP 2010-222061 (Jun. 24, 2014).

*Primary Examiner* — David R Dunn
*Assistant Examiner* — Timothy J Brindley
(74) *Attorney, Agent, or Firm* — Drinker Biddle & Reath LLP

(57) ABSTRACT

Provided is a vehicle seat with an improved rigidity of a seat-base side frame, in which a load from a shoulder anchor portion can be dispersed. The vehicle seat includes: a seat-back frame which includes side frames, a shoulder anchor portion which is disposed in the upper portion of the side frame, and a pair of seat-base side frames which is disposed below the side frames; in which one seat-base side frame which is connected to the lower portion of the side frame includes a lower seat-base side frame and an upper seat-base side frame connected to the upper portion thereof, the upper seat-base side frame includes an upper frame reinforcement portion formed along a shape of an edge in a connection portion, and the lower seat-base side frame includes lower frame reinforcement portions formed along a shape of an upper edge in the connection portion.

6 Claims, 10 Drawing Sheets

(56) References Cited

U.S. PATENT DOCUMENTS

2011/0169317 A1* 7/2011 Fujita et al. ................ 297/452.2
2011/0210592 A1* 9/2011 Watanabe ................... 297/354.1
2012/0038199 A1* 2/2012 Matsumoto et al. ..... 297/452.18
2013/0221725 A1* 8/2013 Yamada et al. .......... 297/452.18

FOREIGN PATENT DOCUMENTS

| JP | 11-115594 A | 4/1999 |
| JP | 2002-059770 A | 2/2002 |
| JP | 2005-067332 A | 3/2005 |

* cited by examiner

VEHICLE SEAT

CROSS REFERENCE TO RELATED APPLICATIONS

This application is the U.S. national phase of the International Patent Application No. PCT/JP2011/072074, filed Sep. 27, 2011, which claims the benefit of Japanese Patent Application No. 2010-222061, filed Sep. 30, 2010, the entire content being incorporated herein by reference.

BACKGROUND

Disclosed herein is a vehicle seat, and particularly, a vehicle seat with a seat-base side frame having a high rigidity against a load from a shoulder anchor portion.

Hitherto, there is known a vehicle seat in which a seat belt is supported by a vehicle seat at three points and is integrated with the vehicle seat. In the vehicle seat having the seat belt integrated therewith, a shoulder anchor is provided at an upper portion of a side frame at the outside (that is, the vehicle door side) of the seatback and a shoulder belt portion of the seat belt is attached to the upper portion of the outer side frame through the shoulder anchor.

In the vehicle seat having the seat belt integrated therewith, since a large load is applied from an occupant to the seat belt particularly at the time of collision of the vehicle, the large load is applied to the outer side frame to which the shoulder belt portion is attached. For this reason, there is known a configuration in which the outer side frame is formed by a pillar having a square closed cross-sectional structure so that the strength thereof is higher than that of the inner side frame (for example, see Japanese Patent Document JP 2002-059770 A ("the '770 Document").

SUMMARY

In the vehicle seat disclosed in the '770 Document, since a load is transmitted from a main back side frame to a main cushion side frame through a lower arm when a load is applied from an occupant to the seat belt at the time of collision of the vehicle, the main cushion side frame provided below the outer side frame is formed as a closed cross-sectional structure to improve the strength against the load applied from the seat belt.

However, in the vehicle seat disclosed in the '770 Document, a large load is generated also in the connection portion between the lower arm (the upper seat-base side frame) and the main cushion side frame (the lower seat-base side frame). Accordingly, as for the structure of the seat-base side frame on which an occupant seats himself/herself, there has been a need for improving the rigidity of the connection portion of the lower seat-base side frame and the upper seat-base side frame.

It is an object of and embodiment of the present invention to provide a seat belt-integrated vehicle seat with an improved rigidity of a seat-base side frame, in which a load applied from a shoulder anchor portion through which a seat belt is inserted can be dispersed.

The above-described problem is solved by a vehicle seat in which the vehicle seat includes: a seatback frame including a pair of side frames and an upper frame connecting the pair of side frames to each other at the upper portions thereof, a shoulder anchor portion provided in the upper portion of one of side frames so that a shoulder belt portion of a seat belt is inserted therethrough, and a pair of seat-base side frames disposed below the pair of side frames; in which one of the seat-base side frames connected to the lower portion of the one of side frames includes a lower seat-base side frame which extends in the front to back direction and an upper seat-base side frame which is connected to the upper portion of the lower seat-base side frame, an upper frame reinforcement portion is formed along an edge shape of the upper seat-base side frame in a connection portion of the upper seat-base side frame and the lower seat-base side frame, and a lower frame reinforcement portion is formed along an upper edge shape of the lower seat-base side frame in the connection portion with the lower seat-base side frame.

In this way, since the reinforcement portion is formed along the shape of each frame at the connection portion of the upper seat-base side frame and the lower seat-base side frame, the rigidity of the connection portion may be improved. With this configuration, even when a load is applied to the shoulder anchor portion through which the seat belt is inserted at the time of rear-end collision, the rigidity against the load transmitted from the shoulder anchor portion to the seat-base side frame is improved, and hence the deformation of the seat-base side frame may be suppressed.

As in an embodiment, it is preferable for the upper frame reinforcement portion to include an upper frame bulged portion being bulged along the edge shape, and for the lower frame reinforcement portion to include a lower frame bulged portion being bulged along the upper edge shape.

Since the vehicle seat has such a configuration, the load which is applied to the side frame near the seatback may be highly efficiently transmitted to the seat-base side frame. As a result, even when a large load is applied to the shoulder anchor portion, it is possible to suppress the deformation in the connection portion of the seat-base side frame and the side frame near the seatback.

Further, since the seat-base side frame is bulged to form the reinforcement portion instead of the configuration in which a separate member is further provided as the reinforcement portion, it is possible to reduce the weight of the vehicle seat.

Further, as in an embodiment, it is preferable for the lower seat-base side frame to include a lower inner surface material provided at the side where an occupant seats himself/herself and a lower outer surface material bonded to the lower inner surface material in a facing state each other, and for the lower frame reinforcement portion to be formed at a position where the lower outer surface material and the lower inner surface material face each other.

In this way, the lower seat-base side frame includes the lower inner surface material disposed inside the seat and the lower outer surface material disposed outside the seat, and they are bonded to each other into the form of casing so that the rigidity of the lower seat-base side frame is improved. Further, since the lower inner surface material and the lower outer surface material may be provided with the reinforcement portion at the position facing each other, it is possible to suppress the lower inner surface material and the lower outer surface material from being deformed into different shapes when a load is applied thereto, and hence to improve the rigidity. As a result, it is possible to suppress the deformation of the connection portion of the upper seat-base side frame and the lower seat-base side frame in the seat-base side frame, and to reduce the weight of the vehicle seat.

As in an embodiment, it is preferable for the upper frame reinforcement portion and the lower frame reinforcement portion to be formed in a continuous shape.

In this way, since the reinforcement portion is formed into a continuous manner in the connection portion of the upper seat-base side frame and the lower seat-base side frame, the transmission of the load is not interrupted and hence the rigidity thereof is improved.

Further, as in an embodiment, it is preferable for the lower frame reinforcement portion to further include a curved convex portion disposed to be separated from the upper edge by a predetermined distance.

In this way, the rigidity against a load is further improved by the curved convex portion which is formed to be separated from the upper edge of the lower seat-base side frame by a predetermined distance, and hence the deformation in the vicinity of the connection portion of the upper seat-base side frame and the lower seat-base side frame may be suppressed. Further, since the reinforcement portion is not provided as a separate member, it is possible to further reduce the weight of the vehicle seat.

Further, as in an embodiment, it is preferable for the convex portion to be curved in a shape along the upper edge shape.

In this way, since the convex portion which is formed to be separated from the upper edge of the lower seat-base side frame by a predetermined distance is curved in a shape along the upper edge of the lower frame reinforcement portion, it is possible to further improve the rigidity against the load transmitted from the shoulder anchor portion.

According to an embodiment of the invention, it is possible to provide the vehicle seat with an improved rigidity of the connection portion by providing the reinforcement portion, in which deformation of the seat-base side frame can be suppressed.

According to an embodiment, it is possible to provide the vehicle seat, in which the load transmitted from the seatback side frame to the seat-base side frame can efficiently be transmitted with a further reduced weight.

According to an embodiment, it is possible to provide the vehicle seat with an improved rigidity of the lower seat-base side frame without deforming the outer surface material and the inner surface material in different shapes at the connection portion of the seat-base side frame.

According to an embodiment, it is possible to provide the vehicle seat, in which the load applied to the seat-base side frame is efficiently transmitted with a high rigidity.

According to an embodiment, it is possible to provide the vehicle seat with an improved rigidity in the vicinity of the connection portion of the upper seat-base side frame and the lower seat-base side frame.

According to an embodiment, it is possible to provide the vehicle seat with an improved rigidity against the transmitted load.

DETAILED DESCRIPTION

Hereinafter, embodiments of the present invention will be described with reference to the drawings. Moreover, the members, the arrangements, and the like described below do not limit the invention, and may be, of course, modified into various forms in accordance with the spirit of the invention. Further, in the specification, a vehicle indicates a ground running vehicle with a vehicle wheel such as an automobile and a train, an airplane or a ship moving in a place other than a ground, and the like to which a seat can be mounted.

FIGS. 1 to 8 are diagrams illustrating an embodiment of the present invention. Moreover, the right and left direction in the description below means the right and left direction in a state where the vehicle faces the front side thereof. Further, in the embodiment, a configuration with a three point type seat belt is shown, but a vehicle seat without the three point type seat belt may be employed.

Figure 1:
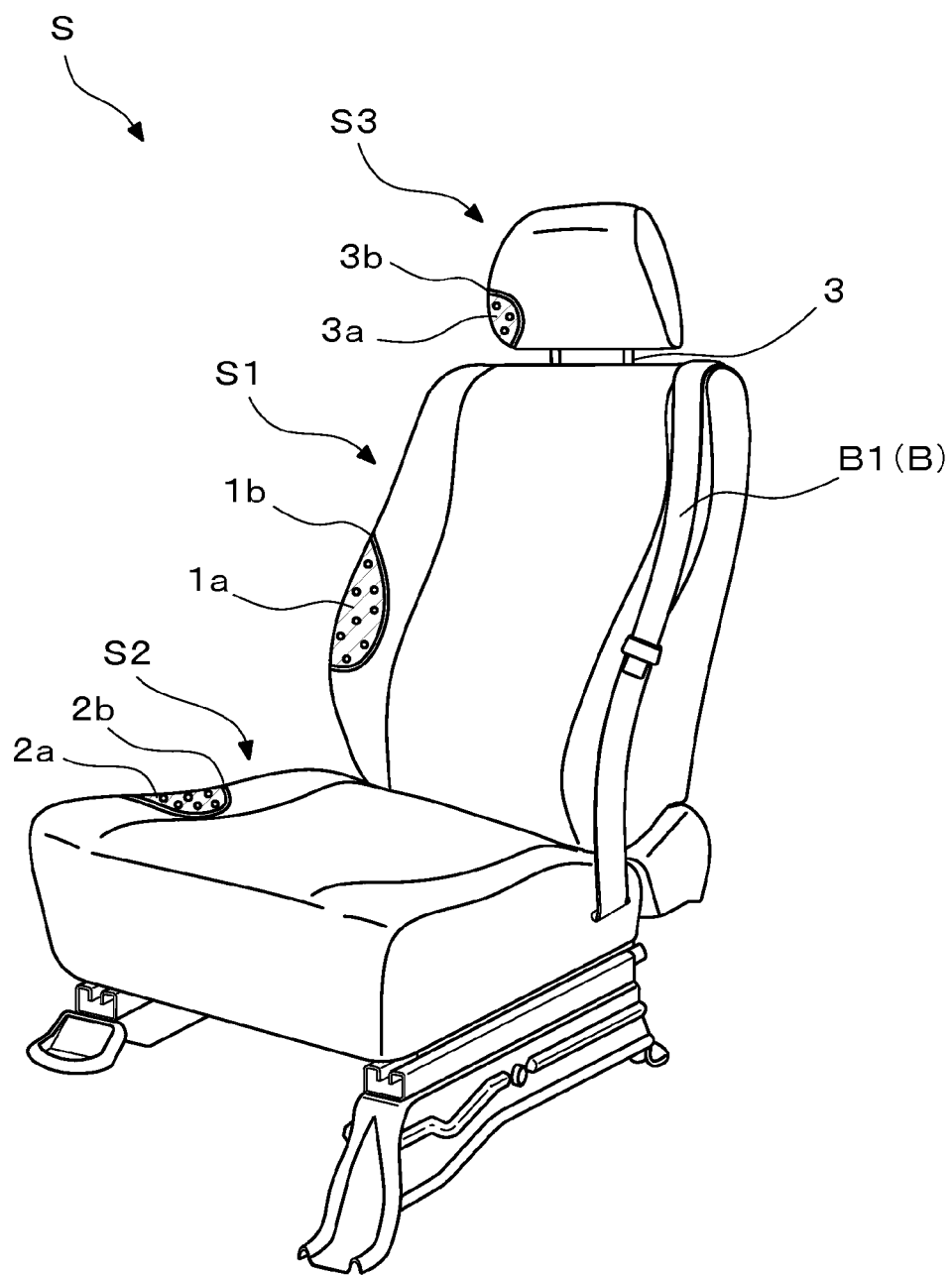
FIG. 1 is a schematic perspective view of a seat according to an embodiment of the present invention.

As illustrated in FIG. 1, a vehicle seat S according to the embodiment includes a seatback S1, a seat base portion S2, and a headrest S3, and the seatback S1 and the seat base portion S2 are formed in a manner that cushion pads 1*a*, 2*a* are placed on a seat frame F and are covered by surface materials 1*b*, 2*b*. Moreover, the headrest S3 is formed in a manner that a pad member 3*a* is disposed on a core member 3 (see FIG. 2) and is covered by a surface material 3*b*. The core member 3 of the embodiment also serves as a headrest pillar which supports the headrest S3, but the core member and the headrest pillar may be formed as separate members.

The vehicle seat S of the embodiment is a front passenger seat, in which the left side (the right side in FIG. 1) of the vehicle seat S is at an outer side of the vehicle body (the vehicle door side) and the right side (the left side in FIG. 1) of the vehicle seat S is at an inner side of the vehicle body (the vehicle body center side). The vehicle seat S is a seat belt-integrated vehicle seat to which a seat belt B is attached, and a shoulder belt portion B1 of the seat belt B is attached to the outer side of vehicle body of the upper portion of the seatback S1.

Figure 2:
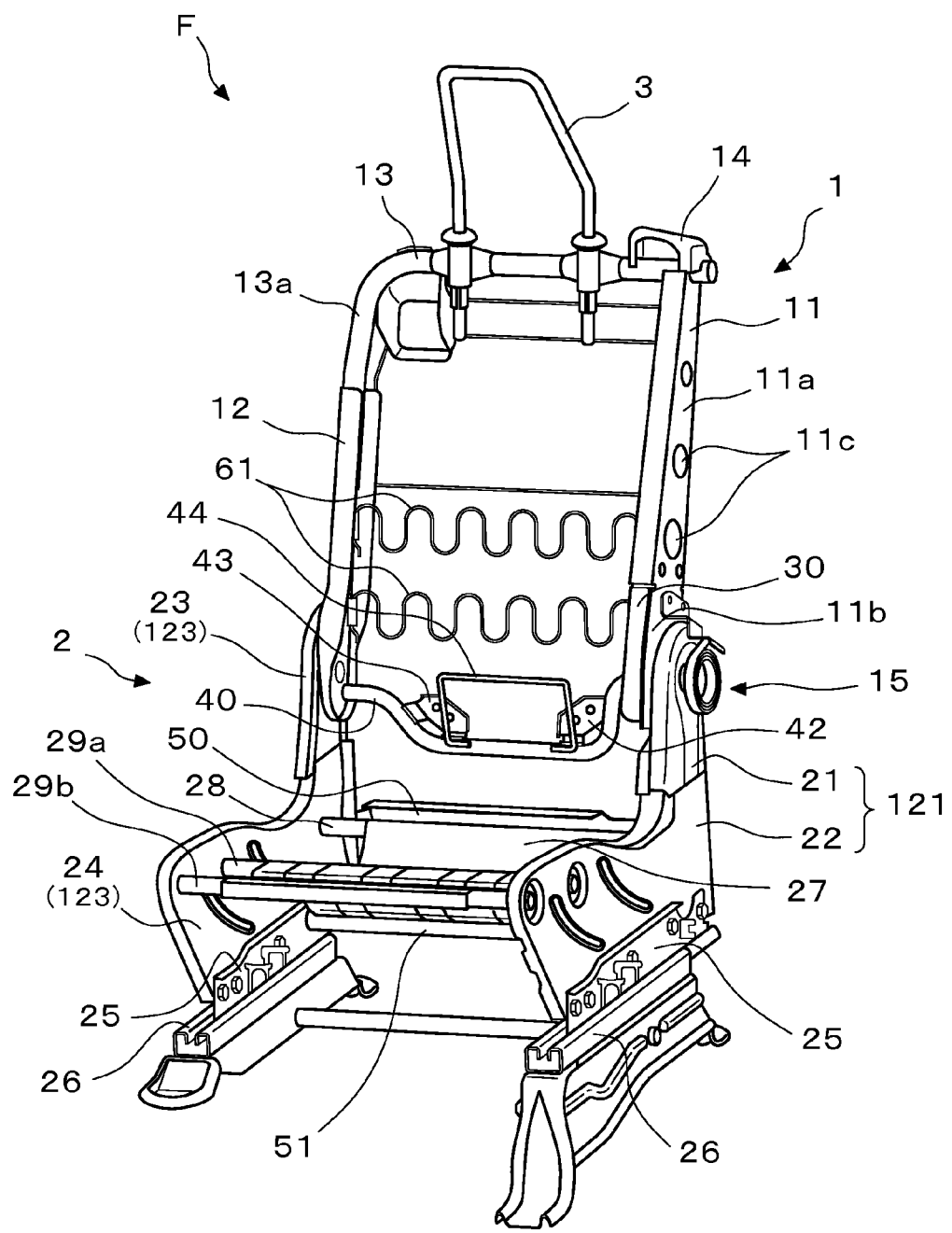
FIG. 2 is a schematic perspective view of a seat frame according to the embodiment of the present invention.
Figure 3:
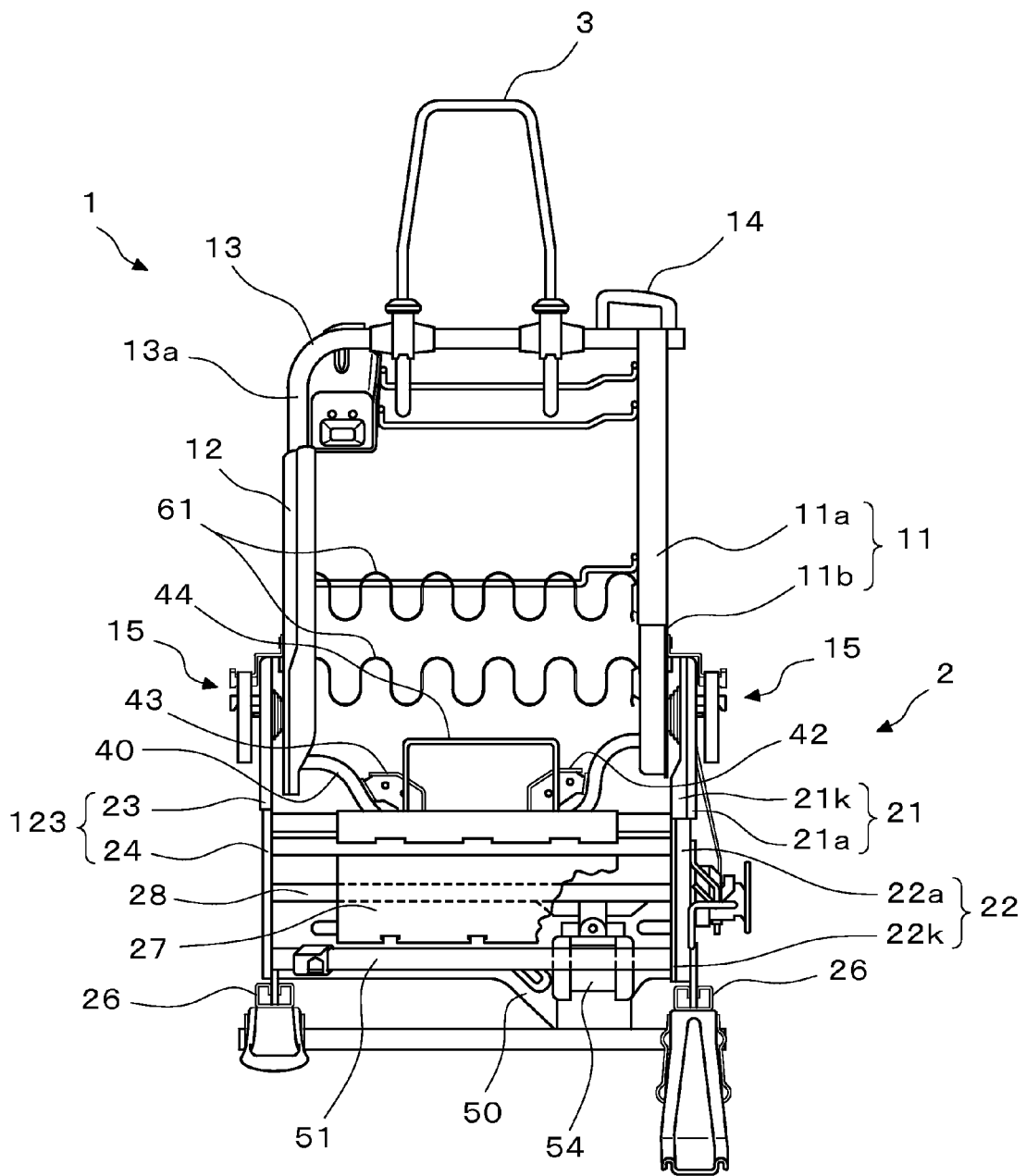
FIG. 3 is a schematic front view of the seat frame according to the embodiment of the present invention.
Figure 4:
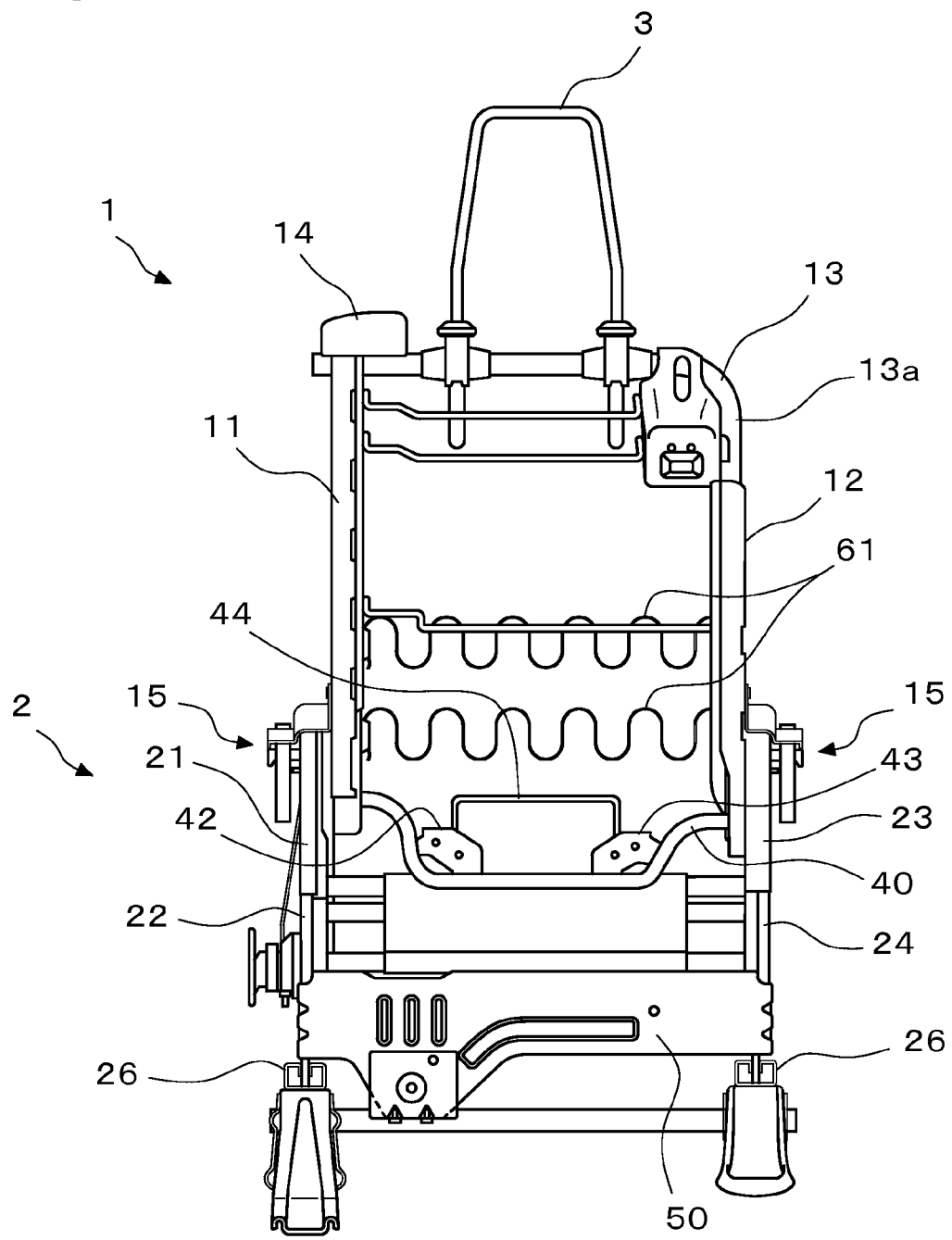
FIG. 4 is a schematic rear view of the seat frame according to the embodiment of the present invention.

As illustrated in FIGS. 2 to 4, the seat frame F of the vehicle seat S includes a seatback frame 1 which forms the seatback S1 and a seat base frame 2 which forms the seat base portion S2. Further, the seatback frame 1 and the seat base frame 2 are connected to each other to be rotatable through a reclining device 15.

As described above, the seatback S1 is used to support an occupant's back from the rear side by a configuration in which the cushion pad 1*a* is placed on the seatback frame 1 and the cushion pad 1*a* is covered with the surface material 1b. In the embodiment, the seatback frame 1 is formed as a substantially rectangular frame which is formed by a metallic plate or tube.

A pair of side frames 11, 12 provided in the seatback frame 1 and extending in the up and down direction are separated from each other in the right and left direction to form the seatback width.

Specifically, the side frames 11, 12 forming a part of the seatback frame 1 are formed with a predetermined length in the up and down direction, and are disposed to face each other with a predetermined gap therebetween in the right and left direction. Further, a straddle member 61 which serves as a posture holding member supporting the cushion pad 1a from the rear side is disposed in an area inside the seatback frame 1 inside the seatback frame 1 (between both side frames 11, 12).

Both ends of the straddle member 61 are axially supported by shaft supporting portions provided in side frame reinforcement members 30 or the side frame 11, 12. The shaft supporting portion may axially support the straddle member 61 in a rotatable manner, and an existing technique may be used. Moreover, instead of the shaft supporting portion, a configuration may be employed in which holes are formed in the side plates of the side frame reinforcement members 30 or the side frame 11 and the side frame 12 and the ends of the straddle member 61 are rotatably inserted into the holes to be retained therein.

In the embodiment, an S-spring which is formed by a steel wire having a spring property is used as the straddle member 61 disposed between the side frames 11, 12. Moreover, the straddle member 61 is not limited to the S-spring, and any member such as a plate shaped member capable of supporting the occupant from the rear side may be disposed therebetween. In addition, of course a mat and a structure with a lumbar supporting function may be employed.

In the side frames 11, 12, the side frame 11 disposed outer side of the vehicle body (the vehicle door side) is formed in a manner that a piece of metallic plate member is bent in a rectangular shape to form a closed cross-sectional structure. Specifically, the cross-sectional shape is formed in a hollow rectangular shape (a closed cross-sectional structure 11a). Further, at the lower portion of the outside surface (the vehicle door side) of the closed cross-sectional structure 11a of the side frame 11, an extension portion 11b formed by elongating a planar plate member downward is integrated with the outer surface of the closed cross-sectional structure 11a. Specifically, a plate member is punched to form a portion which extends to a center portion of one side of the plate member and sheet-metal processing is performed so that the cross-section has a hollow rectangular shape. Further, a plurality of holes 11c is formed on the outer surface of the closed cross-sectional structure 11a.

The side frame 12 which is disposed on the inner side of the vehicle body (vehicle body center side) is formed by bending both ends of a piece of metallic plate member in the vehicle front to back direction toward the inside of the seat frame F.

In this way, the side frame 11 which is disposed on the outer side of the vehicle body has a closed cross-sectional structure, and hence the strength thereof is greater than that of the side frame 12 which is provided at the inner side of vehicle body. In the seat belt-integrated vehicle seat S, when a large load is applied from the occupant to the seat belt B due to the collision or the like of the vehicle, a large load is applied to the side frame 11 to which the shoulder belt portion B1 is attached and which is disposed outer side of the vehicle body. For this reason, a structure such that the rigidity of the side frame 11 outer side of the vehicle body is improved is employed.

The side frame reinforcement member 30 is fixed on the inner side of the seat relative to the extension portion 11b extending downward from the closed cross-sectional structure 11a of the side frame 11, that is, the side which an occupant seats himself/herself of the side frame 11. The side frame reinforcement member 30 is formed by bending one plate member so that its cross-section substantially forms a squared U-shape, in which the side frame reinforcement member has a width in the right and left direction slightly narrower than the width of the closed cross-sectional structure 11a in the seat right and left direction and a width in the front to back direction substantially equal to the width of the extension portion 11b in the seat front to back direction.

When the side frame reinforcement member 30 is disposed on the seat inner portion of the extension portion 11b, the front and back surfaces are jointed to the extension portion 11b through welding or the like in a substantially continuous manner to each other. Further, the upper portion of the seat inner surface of the side frame reinforcement member 30 is disposed on the lower portion of the seat inner surface of the closed cross-sectional structure 11a of the side frame 11 in an overlapping state by a predetermined width, and is jointed thereto by welding or the like in a continuous manner thereto. In this way, the side frame reinforcement member 30 is attached to the side frame 11 to be substantially integrated with each other. Since the side frame 11 to which the shoulder belt portion B1 is attached is formed as a closed cross-sectional structure, the extension portion 11b is integrated with the closed cross-sectional structure 11a, and the side frame reinforcement member 30 is fixed to the inner portion of the extension portion, the rigidity of the side frame 11 may be improved while suppressing degradation in dimensional precision of the attachment positions of the reclining device 15 and the shoulder belt portion B1.

As illustrated in FIGS. 2 to 4, an upper frame 13 is formed by bending a tubular member, a side surface portion 13a of the upper frame 13 is disposed to partially overlap the side plate of the side frame 12, and is jointed to the side frame 12 through welding or the like at the overlapping portion. The other end of the upper frame 13 is jointed to a concave portion which is formed in the upper end of the side frame 11.

Further, the headrest S3 is disposed above the upper frame 13 which forms the seatback frame 1. As described above, the headrest S3 is formed in a manner that the outer periphery of the core member 3 is provided with the pad member 3a and the outer periphery of the pad member 3a is covered with the surface material 3b. A guide lock is attached to the lower side of the core member 3 (the headrest pillar corresponding portion) attached to the upper frame 13, so that the height position may be adjusted.

Further, a shoulder anchor portion 14 through which the seat belt B is inserted is fixed and jointed onto the upper frame 13 near the reinforced side frame 11. The shoulder anchor portion 14 is a box shaped member which is surrounded by a front surface, both right and left surfaces, an upper surface, and a rear surface, in which the front surface has a substantially reversed U-shape in the front view and has a space formed in the center portion. The lower ends of both right and left surfaces of the shoulder anchor portion 14 are jointed to the upper frame 13 through welding or the like, and a space is formed between the upper frame 13 and the rear surface of the shoulder anchor portion 14. The shoulder belt portion B1 is inserted through the space between the upper frame 13 and the shoulder anchor portion 14 from the downside, and is further inserted to be attached to pass through the space formed in the center portion of the front surface.

The shoulder anchor portion 14 is disposed at the substantially same position as that of the side frame 11 positioned outer side of the vehicle body (the vehicle door side) or at the position outer side of the side frame 11.

At the lower side (the side of the seat base frame 2) of the seatback frame 1, the side frames 11, 12 are connected to each other by a member pipe 40 as a connection member. The member pipe 40 is disposed in the right and left direction along the pivot axis direction of the reclining device 15, in which one end thereof is jointed to the side frame reinforcement member 30 integrally fixed to the side frame 11 at the lower side of the side frame 11 so that the member pipe is connected to the side frame 11 through the side frame reinforcement member 30 and the other end thereof is jointed to the lower side of the side frame 12 by welding or the like.

Further, the member pipe 40 may be bent in a concavo-convex shape in the range in which the member pipe 40 does not interfere with the seat base frame 2. In the embodiment, the substantially center part of the member pipe 40 is bent downward to have a concave shape so that the member pipe does not interfere with the occupant's rearward movement when the occupant's waist sinks into the seatback S1. As illustrated in FIG. 2, pipe reinforcement members 42, 43 are jointed to the portion which is bent in a concave shape.

Any number of the straddle members 61 may be provided, and one of them is locked above the end 40a of the member pipe 40 jointed to the side frame reinforcement member 30 and locked below the position where the side frame reinforcement member 30 is jointed to the lower portion of the seat inner surface of the closed cross-sectional structure 11a (see FIG. 5). With such a configuration, the work efficiency is improved during the operation of attaching the straddle member 61. Further, it is possible to effectively use the space between the end 40a of the member pipe 40 and the jointing portion between the side frame reinforcement member 30 and the closed cross-sectional structure 11a.

Since in the member pipe 40, a position corresponding to the occupant's waist is bent to be positioned below the occupant's waist, the occupant is not pressed and stopped by the member pipe 40 when moving rearward. Accordingly, the occupant's upper body may sink into the seatback S1 and the member pipe 40 may sink into the lower side of the occupant without suppressing the rearward movement. Further, since the member pipe 40 is provided with the pipe reinforcement members 42, 43, the rigidity of the member pipe 40 may be improved.

The seat base portion S2 is used to support the occupant's hip from the downside by the above-described configuration in which the cushion pad 2a is placed on the seat base frame 2 and the cushion pad 2a is covered by the surface material 2b from the upside. In the embodiment, as illustrated in FIG. 2, the seat base frame 2 includes seat-base side frames 121, 123, a seat-base-side rear frame 28, and seat-base-side front frames 29a, 29b.

The seat-base side frame 121 includes an upper seat-base side frame 21 and a lower seat-base side frame 22. Further, the seat-base side frame 123 includes an upper seat-base side frame 23 and a lower seat-base side frame 24. The upper seat-base side frames 21, 23 are connected to the extension portion 11b of the side frame 11 and the side frame 12 through the reclining device 15 in a rotatable manner, respectively.

The upper seat-base side frames 21, 23 are connected to the side frames 11, 12, respectively. The upper seat-base side frame 21 of the seat-base side frame 121 which is disposed outer side of the vehicle body is connected to the extension portion 11b of the side frame 11 through the reclining device 15 in a rotatable manner. Further, the upper seat-base side frame 23 of the other seat-base side frame 123 is connected to the side frame 12 through the support shaft in a rotatable manner.

The upper seat-base side frames 21, 23 are formed to be continuous to the lower seat-base side frames 22, 24 respectively at the connection portion with the lower seat-base side frames 22, 24, and are attached to cover the upper ends of the lower seat-base side frames 22, 24.

The lower seat-base side frames 22, 24 are arranged in the right and left direction while being separated from each other to form the seat width, and extend in the front to back direction. Further, as illustrated in FIG. 4, both ends of a retractor attachment bracket 50 which is formed by a plate member connecting the rear sides of the lower seat-base side frames 22, 24 to each other are jointed to the lower seat-base side frames 22, 24, respectively.

The lower seat-base side frames 22, 24 are formed by a metallic plate member, and the rear side thereof extends upward, that is, toward the seatback frame 1. Smooth grooves (beads) are formed on the surfaces of the lower seat-base side frames 22, 24 to correspond to the shapes of the lower seat-base side frames 22, 24. Further, the lower seat-base side frames 22, 24 are jointed to the above-described upper seat-base side frames 21, 23, and the upper seat-base side frames 21, 23 are jointed to the side frames 11, 12 respectively, thereby forming the seat frame F.

The lower seat-base side frames 22, 24 are supported from the downside respectively, and to the lower seat-base side frames 22, 24, the upper rails 25, 25 are attached. Further, the upper rails 25, 25 are slidably formed in a manner that their positions are adjustable in the front to back direction in the lower rails 26, 26 installed in the vehicle body floor.

As illustrated in FIGS. 3 and 4, the surface of the retractor attachment bracket 50 is provided with a plurality of grooves (beads), and a retractor 54 as a seat device is jointed to the front surface of the retractor attachment bracket. The retractor 54 is adapted to extract or wind the seat belt B, and is attached to a position in which the retractor does not contact the seat-base-side rear frame 28, to be described later, near one side frame 11 at the front surface side of the retractor attachment bracket 50 in the embodiment with the three point type seat belt. Moreover, FIG. 3 illustrates a state where a cushion supporting member 27 is partially cut away to illustrate the retractor 54.

Further, the tubular seat-base-side rear frame 28 is attached to a position in front of the retractor attachment bracket 50 and the seat-base-side front frames 29a, 29b are attached to the further front position to connect the lower seat-base side frames 22, 24 to each other. Further, the lower connection member 51 is disposed at the front or lower position of the retractor attachment bracket 50 to connect the lower seat-base side frames 22, 24 to each other. The retractor attachment bracket 50, the seat-base-side rear frame 28, the seat-base-side front frames 29a, 29b, and the lower connection member 51 are formed by a metallic plate member and a tubular member, and the respective ends are fixed and jointed to the lower seat-base side frames 22, 24 through welding or the like.

Further, the cushion supporting member 27 which supports the cushion pad 2a from the downside is disposed in an area inside the seat base frame 2 inside the seat base frame 2 (between both seat-base side frames 121 and 123). The cushion supporting member 27 is formed by a substantially rectangular plate member, and is fixed by bridging a pair of facing front and rear edges in the seat-base-side rear frame 28 and the seat-base-side front frames 29a, 29b.

The cushion supporting member 27 is formed by a metallic plate member, and the plate member is provided with a smooth concavo-convex portion. Moreover, in the embodiment, an example is shown in which the plate member is disposed as the cushion supporting member 27, but the shape and the material are not limited thereto as long as the structure is capable of supporting an occupant and the cushion pad 2*a* from the downside.

Member Pipe 40

In the embodiment, as illustrated in FIG. 2, a configuration is provided in which the member pipe 40 is provided at the lower side of the seatback frame 1, that is, the portion corresponding to the occupant's waist.

Figure 5:
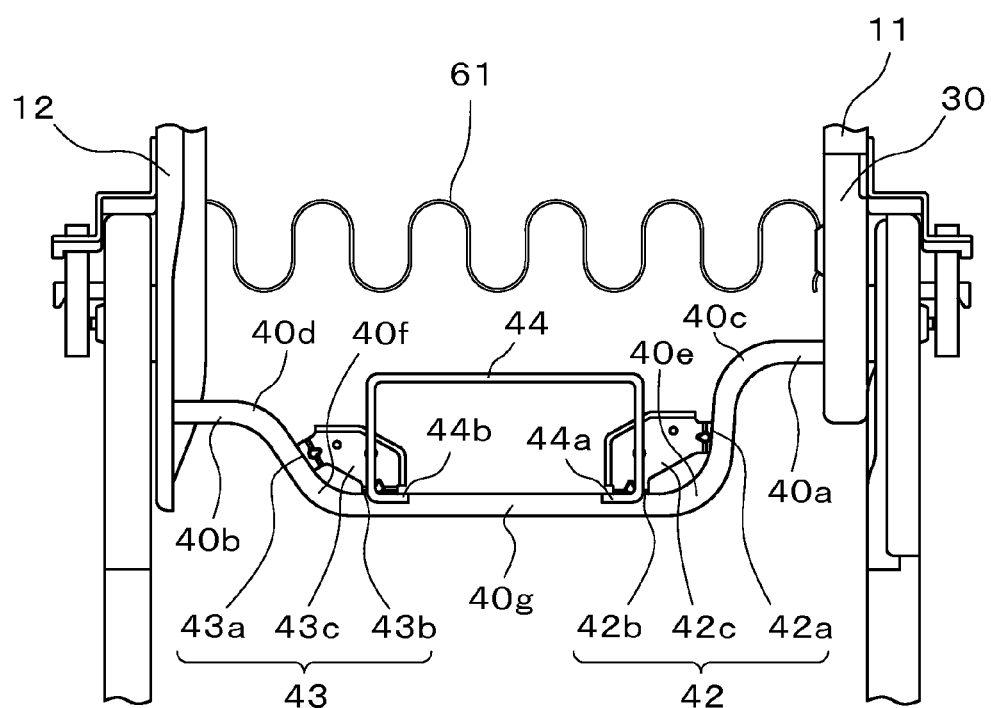
FIG. 5 is an enlarged explanatory front view diagram illustrating a configuration of a member pipe and an energy absorbing member according to the embodiment of the present invention.

The member pipe 40 is formed by a metallic wire or a tubular member, and as illustrated in FIG. 5, the ends 40*a* and 40*b* are jointed to the side frame reinforcement member 30 and the side frame 12 respectively through welding. The side frame reinforcement member 30 is integrated with the side frame 11, and the end 40*a* is connected to the side frame 11 through the side frame reinforcement member 30. Accordingly, the side frames 11, 12 are connected to each other by the member pipe 40 at the lower side thereof.

Moreover, in the embodiment, an example is shown in which the side frame reinforcement member 30 is attached to the side frame 11, but a configuration may be provided in which the end 40*a* is connected to the side frame 11 without the side frame reinforcement member 30.

Further, as for the height position in which the ends 40*a*, 40*b* are jointed to the subject, the end 40*a* which is jointed on the side of the side frame 11 provided with the shoulder anchor portion 14 is disposed at a position higher than the other end 40*b*. Specifically, the end 40*a* which is jointed to the side frame reinforcement member 30 is disposed at a position higher than the other end 40*b*. Moreover, as for the attachment height, the member pipe 40 is bent so that the end 40*a* is disposed at the highest position.

In this way, in embodiments of the present invention, the end 40*a* of the member pipe 40 is attached to a position higher than the end 40*b*, and the attachment heights of the ends 40*a*, 40*b* are different from each other. Further, since the member pipe 40 is bent in an asymmetrical shape, even when a large amount of energy is applied to the shoulder anchor portion 14 at the time of rear-end collision, the load may be effectively dispersed and absorbed.

Further, in the ends 40*a*, 40*b*, the attachment height of the end 40*a* which is provided at the upper side is jointed to a position lower than the center shaft of the reclining device 15. Further, the highest portion of the member pipe 40 is disposed below the center shaft about which the reclining device 15 pivots. With this configuration, the occupant's waist may sink into the seatback S1 without suppressing the rearward movement of the occupant's waist.

In the member pipe 40, the substantially center part of the bent portion described above, that is, a center portion 40*g* is disposed at the lower side, and the member pipe 40 is bent in a concave shape. More specifically, the member pipe 40 includes bent portions 40*c*, 40*d*, 40*e*, and 40*f* between the ends 40*a*, 40*b*, and the center portion 40*g* is formed to be flat at the substantial center position, that is, the portion corresponding to the occupant's waist. The bent portions 40*c*, 40*d* near the ends 40*a*, 40*b* are bent downward, and the respective ends 40*a*, 40*b* are disposed at a position higher than the bent portions 40*c*, 40*d* or the substantially same height position.

Moreover, in the embodiment, the case of a single member pipe 40 has been described, but a plurality of member pipes may be provided in parallel in the up and down direction. In this case, since the upper surface of the member pipe 40 disposed at the uppermost position may be disposed below the occupant's waist so that the occupant's rearward movement is not interfered with. Further, the member pipe 40 may not necessarily include the bent portions 40*c*, 40*d*, 40*e*, and 40*f* which are bent substantially perpendicularly, and a straight member pipe 40 may be provided as long as at least the center portion 40*g* is disposed below the occupant's waist.

More specifically, it is preferable for the upper surface of the member pipe 40 to be disposed below the fifth lumbar spine of the occupant. With such a configuration, since the member pipe 40 is disposed below the sacral spine portion of the occupant, the member pipe 40 may sink into the lower side of the occupant due to the inclination of the sacral spine portion at the time of the rearward movement.

Further, the member pipe 40 is provided with the pipe reinforcement members 42, 43 which reinforce the bent portions 40*e*, 40*f*. The pipe reinforcement members 42, 43 are jointed while straddling the inside (the small angle side) of the bent portions 40*e*, 40*f*, and are fixed and jointed by the reinforcement member jointing portions 42*a*, 42*b*, 43*a*, and 43*b*. By providing the pipe reinforcement members 42, 43, the load which is particularly applied to the bent portions 40*e*, 40*f* may be received, and hence the rigidity of the member pipe 40 may be improved.

The pipe reinforcement members 42, 43 are disposed at a position lower than the center shaft about which the reclining device 15 pivots. Further, more specifically, the uppermost ends of the pipe reinforcement members 42, 43 are disposed below the center shaft of the reclining device 15. With such a configuration, no interference with the occupant's waist occurs, and the occupant's rearward movement is not suppressed.

As illustrated in FIG. 5, since the bent portions 40*c*, 40*d*, 40*e*, and 40*f* of the member pipe 40 are bent in different ways, the pipe reinforcement members 42, 43 are formed in different shapes, respectively. Hereinafter, the pipe reinforcement member 43 will be described in detail with reference to FIG. 6. Moreover, although in the pipe reinforcement members 42 provided as a pair, straddle portions 42*c* have slightly different shapes from each other, they will not be described since the straddle portions have a substantially the same configuration.

Figure 6:
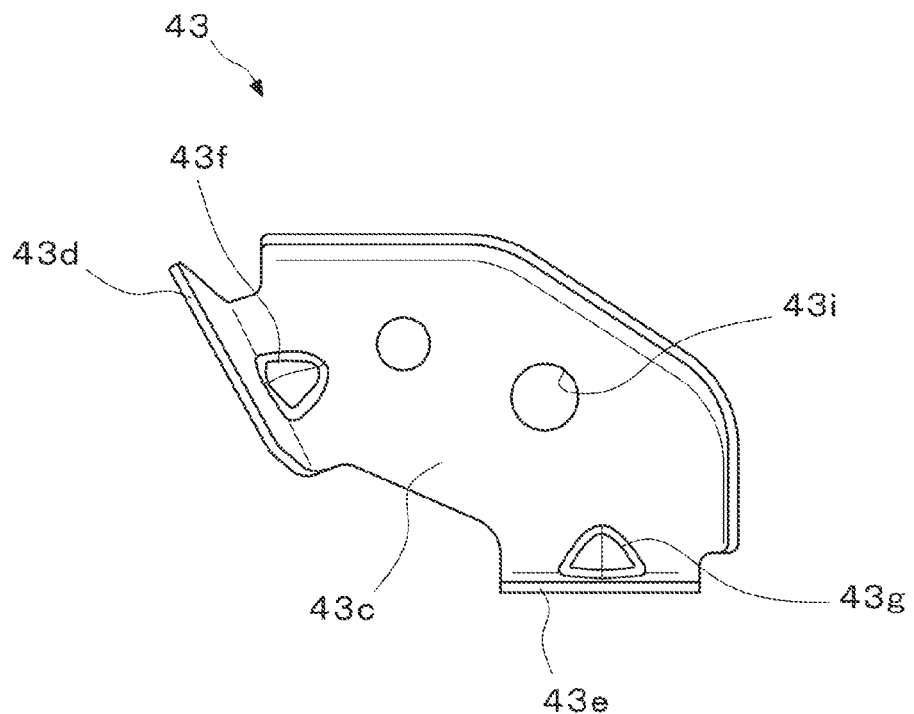
FIG. 6 is a front view of a pipe reinforcement member according to the embodiment of the present invention.

As illustrated in FIG. 6, the pipe reinforcement member 43 is formed by a planar plate member, and includes a straddle portion 43*c* which is formed in an asymmetrical arch shape in the right and left direction to correspond to the shapes of the bent portions 40*d*, 40*f* of the member pipe 40. The straddle portion 43*c* is formed in a planar shape which is asymmetrical in the right and left direction, and is formed to straddle the bent portion 40*f* of the member pipe 40.

Further, leg portions 43*d*, 43*e* which abut against the member pipe 40 extend from the member pipe 40 of the straddle portion 43*c*. The leg portions 43*d*, 43*e* are formed to be substantially bent in the perpendicular direction from the straddle portion 43*c*, and the leg portions 43*d*, 43*e* are bent toward the same surface side with respect to the surface of the straddle portion 43*c*.

Convex portions 43*f*, 43*g* are formed to straddle the portions between the straddle portion 43*c* and the leg portions 43*d*, 43*e*, respectively. More specifically, the beads as the convex portions 43*f*, 43*g* are formed to straddle the portions which are formed between the straddle portion 43*c* and the leg portions 43*d*, 43*e*, and are bent substantially perpendicularly. In this way, the strength of the pipe reinforcement member 43 may be improved by forming the beads.

Further, the straddle portion 43c is provided with a plurality of holes 43i. In this way, when the plate member is perforated, the weight of the pipe reinforcement member 43 may be further reduced.

Figure 7:
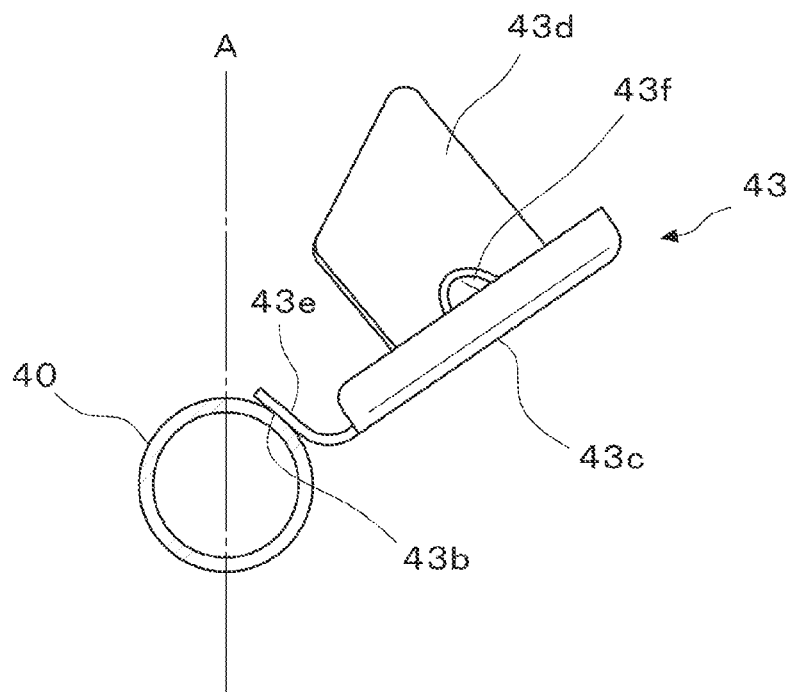
FIG. 7 is a side view illustrating a relation between the pipe reinforcement member and the member pipe according to the embodiment of the present invention.

Since the member pipe 40 is formed by a columnar wire or a tubular member, the reinforcement member jointing portion 43b is jointed to the upper surface of the member pipe 40 in a state where the leg portion 43e is positioned along the upper surface as illustrated in FIG. 7. In this case, it is preferable for the leg portion 43e (the reinforcement member jointing portion 43b) to be disposed behind the center line (the line A of FIG. 7) of the cross-section of the member pipe 40. With such an attachment position, a back cover 62 to be described later may be easily attached to the straddle portion 43c and hence the attachment strength may be improved.

In this way, when the reinforcement member jointing portion 43b is provided at the rear side surface of the member pipe 40 and the bent portion between the straddle portion 43c and the leg portion 43e is disposed behind the seatback frame 1, the movement of the occupant's waist is not interfered with by the pipe reinforcement member 43 when the occupant's waist sinks.

Energy Absorbing Member 44

As illustrated in FIG. 2, an EA wire as the energy absorbing member 44 is provided at the lower side of the seatback frame 1, that is, the portion corresponding to the occupant's waist. The energy absorbing member 44 is jointed to the member pipe 40 disposed below the seatback frame 1.

As illustrated in FIG. 5, the energy absorbing member 44 is formed by a metallic wire (a bar member) or a tubular member, and both ends are bent to be jointed to the member pipe 40. Further, the vicinities of both ends of the energy absorbing member 44 are bent respectively inward along the surface of the member pipe 40 to form jointing portions 44a, 44b. Further, the pipe reinforcement members 42, 43 are jointed to the vicinities of the jointing portions 44a, 44b.

At this time, it is preferable that the vicinities of both ends of the energy absorbing member 44 are jointed to the leg portion (not illustrated) of the pipe reinforcement member 42 and the leg portions 43d, 43e of the pipe reinforcement member 43, and are jointed to the member pipe 40.

With this configuration, the energy absorbing member 44 may be strongly attached to the member pipe 40.

Further, the energy absorbing member 44 which is formed by the flexible wire is flexibly bent rearward when the occupant's waist moves rearward about the strongly jointed jointing portions 44a, 44b as the support points (the support axes) to absorb the energy.

The energy absorbing member 44 is disposed on the member pipe 40 and is attached in front of the pipe reinforcement members 42, 43 of the member pipe 40. More specifically, the jointing portions 44a, 44b of the energy absorbing member 44 are provided in front of the reinforcement member jointing portions 42b, 43b of the pipe reinforcement members 42, 43 disposed on the member pipe 40.

The energy absorbing member 44 is attached to the center portion 40g at which the member pipe 40 is substantially formed in a linear shape in the vicinity of the approximate center of the member pipe 40. Further, the EA wire which forms the energy absorbing member 44 is bent in a substantially rectangular shape, and is jointed to the substantially linear portion of the center portion 40g of the member pipe 40 along the upper surface of the center portion 40g. In this way, since the EA wire which is bent in a substantially rectangular shape extends upward, the energy absorbing member 44 of the embodiment forms a substantially rectangular frame.

Since the energy absorbing member 44 is disposed to be positioned above the member pipe 40, the energy absorbing member 44 is disposed at a position corresponding to the occupant's waist. In this way, when the EA wire which forms the energy absorbing member 44 is attached to the upper side of the member pipe 40, a frame is formed. Accordingly, the frame may support the occupant's waist.

Accordingly, compared to the case where the plate member is used as a member that absorbs energy when the occupant's upper body moves rearward, the weight of the vehicle seat S may be reduced by forming a frame by the EA wire to form the energy absorbing member 44, as in the embodiment.

Seat-Base Side Frames 121, 123

In the embodiment, as illustrated in FIG. 2, the seat-base side frames 121, 123 of the seat base frame 2 which form the seat width are disposed below the side frames 11, 12, respectively. Further, the seat-base side frame 121 includes the lower seat-base side frame 22 which extends in the front to back direction of the vehicle and the upper seat-base side frame 21 which is connected to the rear upper portion of the lower seat-base side frame 22. As in the seat-base side frame 123, the seat-base side frame includes the lower seat-base side frame 24 and the upper seat-base side frame 23.

In the seat-base side frame 121 which is connected to the lower side of the side frame 11 on which the shoulder anchor portion 14 is disposed, the upper seat-base side frame 21 is connected to the side frame 11 through the reclining device 15.

In the seat-base side frame 121 that is connected to the side frame 11 on which the shoulder anchor portion 14 is disposed, as illustrated in FIG. 3, the lower seat-base side frame 22 includes plate members which are formed in the inside of the seat (the side where an occupant seats himself/herself) and on the outside of the seat (the vehicle door side) to have substantially the same shape and size. Specifically, the lower seat-base side frame 22 includes a lower outer surface material 22a which is disposed on the outside of the seat and a lower inner surface material 22k which is disposed in the inside of the seat.

The lower outer surface material 22a and the lower inner surface material 22k face each other, the edges are bent substantially perpendicularly, and the bent edges are jointed to each other in an overlapping state. Specifically, the lower outer surface material 22a and the lower inner surface material 22k are formed by a plate member that has a squared U-shaped cross-section, and the facing edges are jointed to each other to form a hollow casing.

At this time, the upper rear ends of the lower outer surface material 22a and the lower inner surface material 22k, that is, the portions connected to the upper seat-base side frame 21 in an overlapping state are not jointed and opened. Moreover, when a sufficient strength may be obtained without bending and jointing all edges, only a part of the edges may be jointed to each other. For example, only the upper edges 22b, 22l forming the occupant seat surface may be jointed to each other (see FIG. 8).

Further, the upper seat-base side frame 21 is also provided with an upper outer surface material 21a and an upper inner surface material 21k as plate members which are formed inside and outside the seat to have substantially the same shape and size.

As for the jointing relation between the upper seat-base side frame 21 and the lower seat-base side frame 22, the rear side and the upper side of the lower outer surface material 22a overlaps the lower side of the upper outer surface material 21a at a connection portion 21x (see FIG. 8) and the portions are jointed to each other through welding. More specifically, a part of the lower side of the upper inner surface material 21k is jointed to the upper rear end side of the lower inner surface material 22k in an overlapping state. Further, the upper outer surface material 21a and the upper inner surface material 21k which have a substantially same shape and size are jointed to each other in a state facing each other, and the lower outer surface material 22a and the lower inner surface material 22k are interposed therebetween.

At this time, the upper outer surface material 21a and the upper inner surface material 21k which form the upper seat-base side frame 21 are bent in the substantially perpendicular direction so that the edges overlap each other, and the edges are jointed to each other in an overlapping state.

Figure 8:
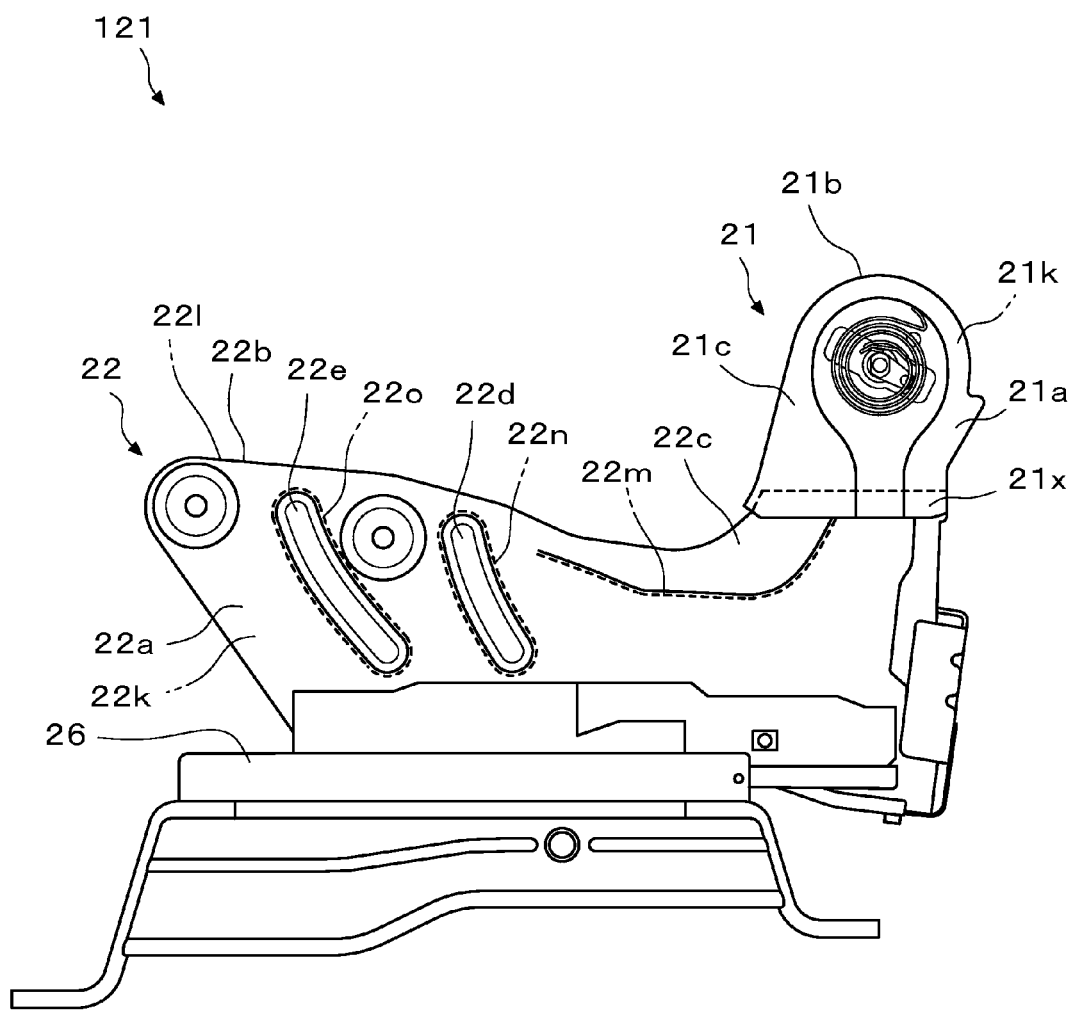
FIG. 8 is an explanatory side view diagram of a seat-base side frame according to the embodiment of the present invention.

In the seat-base side frame 121 of the present invention, as illustrated in FIG. 8, the connection portion 21x of the upper seat-base side frame 21 and the lower seat-base side frame 22 is provided with a reinforcement portion (an upper frame reinforcement portion 21c and lower frame reinforcement portions 22c, 22m) which improves the rigidity against the load from the shoulder anchor portion 14. Further, the reinforcement portion may be provided in the vicinity of at least the connection portion 21x, that is, the side where an occupant seats himself/herself, or may be provided at a position separated from the connection portion 21x on the upper seat-base side frame 21 and the lower seat-base side frame 22.

The upper seat-base side frame 21 includes an upper frame bulged portion 21c which is formed as an upper frame reinforcement portion along the edge 21b, that is, the outer peripheral shape. The upper frame bulged portion 21c is formed so that a part of the upper outer surface material 21a is bulged toward the outside of the seat along the shape of the edge 21b, and is formed to surround the periphery of the reclining device 15 except the attachment position thereof.

Moreover, in the embodiment, a configuration has been described in which the upper outer surface material 21a is provided with the upper frame bulged portion 21c, but even the upper inner surface material 21k may also be provided with a bulged portion which is positioned in the periphery of the reclining device 15 to be bulged toward the inside of the seat. In particular, it is preferable that the bulged portion is provided above the pivot shaft (the center shaft) of the reclining device 15 since the rigidity is further improved.

The lower seat-base side frame 22 includes a lower frame outer surface bulged portion 22c which is formed as a lower frame reinforcement portion along the shape of the edge 22b in the vicinity of the connection portion 21x. The upper edge 22b is curved smoothly, and the wide lower frame outer surface bulged portion 22c is formed along the shape so that a part of the lower outer surface material 22a is bulged toward the outside of the seat. As for the lower frame outer surface bulged portion 22c, the width from the upper edge 22b may not be necessarily parallel to the width of the upper edge 22b, and the width may vary in accordance with the position, as in the embodiment.

The upper frame bulged portion 21c and the lower frame outer surface bulged portion 22c are formed in a shape in which these portions overlap each other in a continuous state. Compared to the case where the upper frame bulged portion 21c and the lower frame outer surface bulged portion 22c are formed in a shape in which these portions are divided and independent from each other, the rigidity against the load applied to the connection portion 21x is further improved by forming these portions in a continuous state.

Further, the lower seat-base side frame 22 further includes outer surface beads 22d, 22e which are positioned at the front side on the lower outer surface material 22a. The outer surface beads 22d, 22e are arranged in an elongated shape in the up and down direction so that a part of the lower outer surface material 22a is bulged in a curved shape toward the outside of the seat. With this configuration, the rigidity of the lower seat-base side frame 22 is improved.

The lower inner surface material 22k which is disposed facing the lower outer surface material 22a is also provided with the lower frame inner surface bulged portion 22m as the lower frame reinforcement portion. The lower frame inner surface bulged portion 22m is formed so that a part of the lower inner surface material 22k is bulged toward the inside of the seat along the shape of the upper edge 22l of the lower inner surface material 22k.

Further, the lower seat-base side frame 22 further includes inner surface beads 22n, 22o which are provided at the front position on the lower inner surface material 22k. The inner surface beads 22n, 22o have a configuration in which a part of the lower inner surface material 22k is bulged in a curved shape toward the inside of the seat, and is formed in an elongated shape in the up and down direction.

Further, the lower frame outer surface bulged portion 22c and the lower frame inner surface bulged portion 22m are provided at the facing position. Further, the outer surface beads 22d, 22e and the inner surface beads 22n, 22o are provided respectively at the position facing each other.

With this configuration, the rigidity of the lower seat-base side frame 22 may be further improved.

Further, the end of the seat-base-side front frame 29a is disposed between the outer surface beads 22d, 22e and the inner surface beads 22n, 22o, and one end is jointed to the lower seat-base side frame 24 of the seat-base side frame 123 (see FIGS. 2 and 8). With such a configuration, the connection strengths of the seat-base side frames 121 and 123 are desirably improved.

The upper seat-base side frame 23 and the lower seat-base side frame 24 are arranged while being jointed to the seat-base side frame 123 on which the shoulder anchor portion 14 is not disposed. It is desirable to dispose the seat-base side frame 121 and the seat-base side frame 123 in an asymmetrical shape.

Specifically, it is desirable that the upper seat-base side frame 23 and the upper seat-base side frame 21 provided on the side where the shoulder anchor portion 14 is disposed at the upper side thereof be formed in different shapes and sizes. Further, it is desirable that the lower seat-base side frame 24 and the lower seat-base side frame 22 be formed in different shapes and sizes. In particular, the shape at the position corresponding to the connection portion 21x may be different.

In this way, when the upper seat-base side frames 21 and 23 and the lower seat-base side frames 22, 24 are formed asymmetrically to each other, the load generated particularly from the lateral side may be efficiently dispersed and transmitted.

The vicinity of the connection portion 21x of the upper seat-base side frame 21 and the lower seat-base side frame 22 is formed in a shape in which the edges of the side where an occupant seats himself/herself are continuous to each other and is formed in a substantially circular-arc shape. The side where an occupant seats himself/herself of the connection portion of the upper seat-base side frame 23 and the lower seat-base side frame 24 are also formed in a substantially circular-arc shape, but it is preferable for the seat-base side frame 121 and the seat-base side frame 123 to have different circular-arc radiuses, that is, different curved shapes.

In this case, it is preferable for the radius of the circular-arc in the vicinity of the connection portion 21x of the upper seat-base side frame 21 and the lower seat-base side frame 22 provided below the shoulder anchor portion 14 to be larger than that of one seat-base side frame 123. Specifically, on the side of the seat-base side frame 121 where the shoulder anchor portion 14 is attached, it is preferable for the seat side edge of the connection portion 21x to be formed in a gently curved shape compared to the equivalent portion of another seat-base side frame 123. With this configuration, the load from the shoulder anchor portion 14 may be efficiently dispersed to both the seat-base side frames 121, 123.

Further, the lower seat-base side frame 24 which is disposed at the side without the shoulder anchor portion 14 is formed by one plate member as not in the lower seat-base side frame 22 in which the lower outer surface material 22a and the lower inner surface material 22k are jointed to each other in a facing state. Further, the surface of the lower seat-base side frame 24 is also provided with a bulged portion or a convex portion which is bulged toward the outside or inside of the seat (refer to FIG. 2).

It is desirable that the bulged portion or the convex portion which is formed on the surface of the lower seat-base side frame 24 have a different shape at the asymmetrical position with respect to the lower frame outer surface bulged portions 22c, 22m provided in the other lower seat-base side frame 22. With such a configuration, the load from the shoulder anchor portion 14 may be further easily dispersed.

In particular, it is preferable for the bulged portion or the convex portion to be formed in an asymmetrical position and shape in the vicinity of the position corresponding to the connection portion 21x of the seat-base side frame 121.

Figure 9:
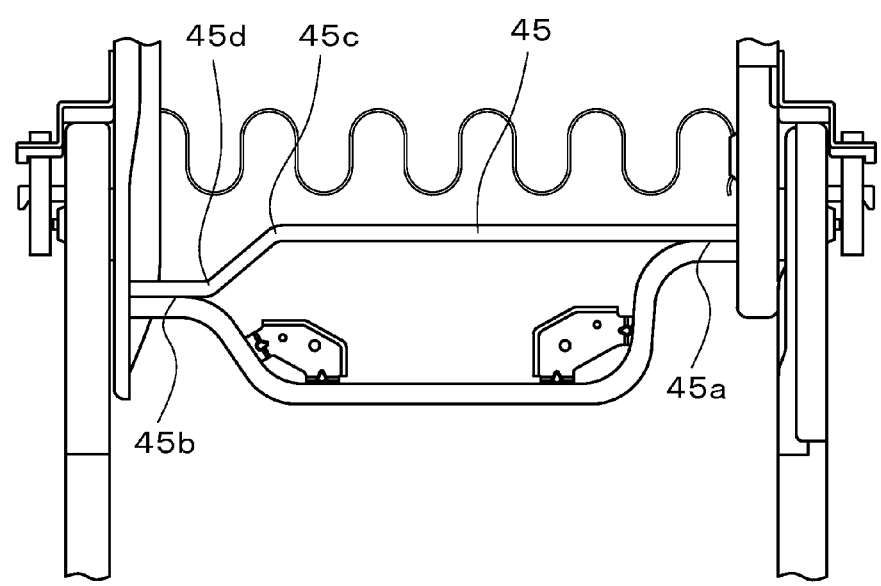
FIG. 9 is an enlarged explanatory front view diagram illustrating a configuration of a member pipe and an energy absorbing member according to another embodiment of the present invention.
Figure 10:
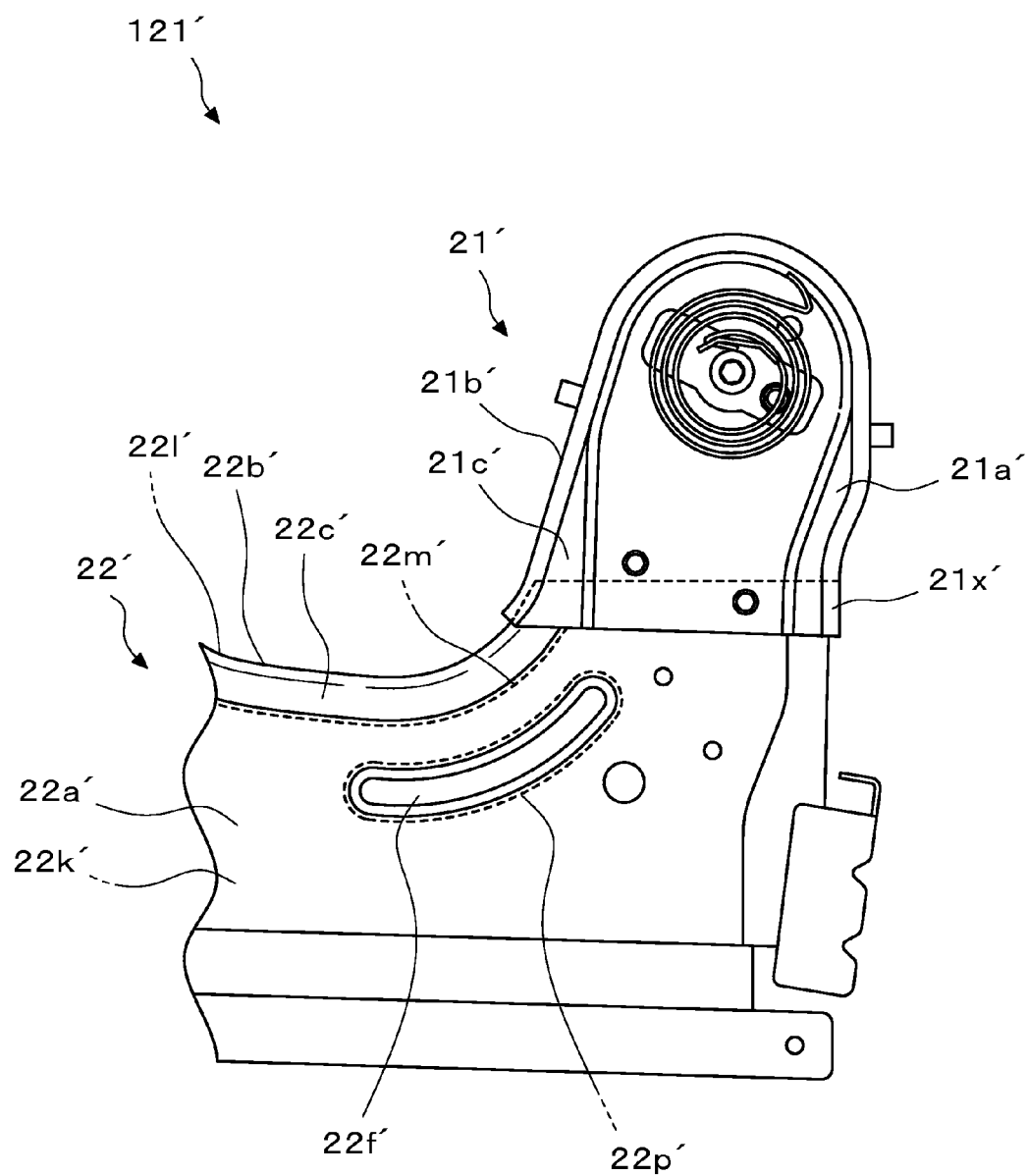
FIG. 10 is an explanatory side view diagram of a seat-base side frame according to another embodiment of the present invention.
Figure 11:
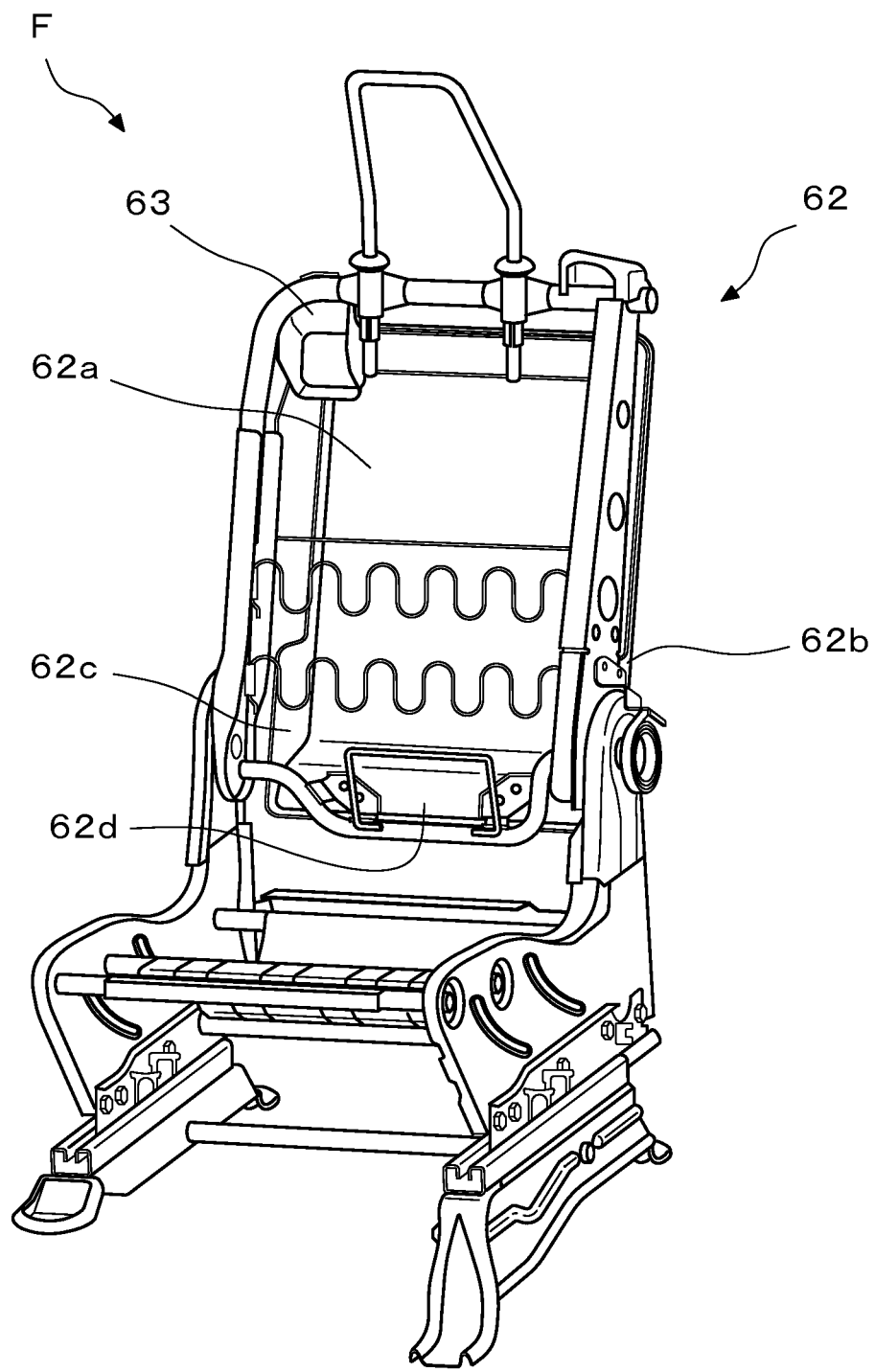
FIG. 11 is an explanatory perspective view diagram illustrating a relation between a seatback frame and a back cover according to another embodiment of the present invention.

Hereinafter, another embodiment which may be applied to each member forming the vehicle seat S of the present invention will be described with reference to the drawings. FIGS. 9 to 11 illustrate another embodiment of the present invention.
Energy Absorbing Member 45

FIG. 9 illustrates another embodiment of the present invention and is an enlarged explanatory diagram illustrating a configuration of the member pipe 40 and an energy absorbing member 45.

This embodiment is characterized in that the energy absorbing member 45 is formed in a substantially linear shape as not in the above-described embodiment in which the energy absorbing member 44 is formed in a substantially rectangular shape. Since the material, the effect, and the like, used in the energy absorbing member 45 are the same as those of the above-described embodiment other than the configuration, the description thereof will not be repeated.

In the embodiment, the EA wire as the energy absorbing member 45 is formed in a substantially linear shape in the right and left direction on the inside of the seatback frame 1 and is provided above the member pipe 40, as in FIG. 9. Further, the vicinities of both ends of the energy absorbing member 45 form jointing portions 45a, 45b respectively along the surface of the member pipe 40. Further, the jointing portions 45a, 45b are provided in the vicinity of the side frame reinforcement member 30 and the side frame 12.

At this time, when the ends of the energy absorbing member 45 are jointed to the side frame reinforcement member 30 and the side frame 12, the jointing area of the energy absorbing member 45 is further widened, and hence the attachment strength of the energy absorbing member 45 may be improved.

As described above, since the attachment heights of the ends 40a, 40b of the member pipe 40 are different from each other, the end 40b disposed at the lower side, that is, the vicinity of the end of the energy absorbing member 45 without the shoulder anchor portion 14 in a bent state. In the energy absorbing member 45, the vicinity of the jointing portion 45b is bent and is provided with bent portions 45c, 45d. Further, the jointing portion 45b is disposed on the surface of the end 40b of the member pipe 40 along the length direction.

In this way, since the energy absorbing member 45 is provided above the bent member pipe 40, it is possible to absorb the energy generated when the occupant's waist moves rearward by supporting the occupant's waist from the rear side when the waist moves rearward.

The energy absorbing members 44, 45 with the above-described configuration are disposed at a position corresponding to the occupant's waist, more specifically, a position corresponding to the fourth and fifth lumbar spine regions, thereby effectively absorbing the energy generated by the rearward movement caused by the inertia force at the time of rear-end collision.
Seat-Base Side Frame 121'

FIG. 10 illustrates another embodiment of the present invention and is an explanatory diagram of a seat-base side frame 121'. In this embodiment, an outer surface convex portion 22f is further disposed as a lower frame reinforcement portion (convex portion), which differs from the above-described embodiment in which the connection portion 21x is provided with only the lower frame outer surface bulged portion 22c as the lower frame reinforcement portion. Moreover, as for the seat-base side frame 121' of this embodiment, the description of the same configuration as that of the seat-base side frame 121 of the above-described embodiment will not be repeated.

The outer surface convex portion 22f is a bead which is bulged in the seat outer direction, is separated from the upper edge 22b' by a predetermined distance, and is bent in a shape following the upper edge 22b'. Further, a lower frame outer surface bulged portion 22c' is formed in a shape following the upper edge 22b'. Further, as in the lower frame outer surface bulged portion 22c', the lower frame inner surface bulged portion 22m' is also formed along the upper edge 22l'.

Further, in the upper seat-base side frame 21', an upper frame bulged portion 21c' is formed along the edge 21b', that is, a part of the outer periphery. In the above-described embodiment, the upper frame bulged portion 21c is provided in the substantially entire area of the edge 21b, but as in the embodiment, the upper frame bulged portion may be provided only in the vicinity of a connection portion 21x' provided below an upper outer surface material 21a'.

Further, the outer surface convex portion 22f is disposed in a lower outer surface material 22a', but may also be provided in a lower inner surface material 22k'. In this case, in the lower inner surface material 22k', an inner surface convex portion 22p' as a lower frame reinforcement portion (convex portion) may be provided at a position facing the outer surface convex portion 22f.

Further, the bead such as the outer surface beads 22d, 22e in the above-described embodiment (see FIG. 8) may further be provided, and the two beads may be formed so that the outer surface convex portion 22f is connected. In this way, when the plurality of beads are connected to each other, the rigidity of the lower seat-base side frame 22' is further improved.

In this way, since the connection portion 21x' of the upper seat-base side frame 21' and the lower seat-base side frame 22' is provided with the upper frame bulged portion 21c' which is bulged along the edge 21b' of the upper seat-base side frame 21' and the lower frame outer surface bulged portion 22c' which is bulged along the upper edge 22b' of the lower seat-base side frame 22', the rigidity of the connection portion 21x' against the load applied from the shoulder anchor portion 14 is improved.

Back Cover 62

As in FIG. 11, the seatback frame 1 may be provided with the back cover 62. The back cover 62 is a plate shaped member which is formed by a synthetic resin or the like, and is attached to the rear side of the seatback frame 1. Further, the back cover 62 is assembled to cover the rear side of the cushion pad 1a along with the surface material 1b.

The back cover 62 includes a back surface portion 62a which is disposed at a position in which the back surface 62a portion covers the rear side of the seatback frame 1, side surface portions 62b, 62c which extend forward from the lateral side of the back surface portion 62a, and a bottom surface portion 62d which extends forward from the lateral side of the back surface portion 62a. The back surface portion 62a is formed by a substantially rectangular planar plate member that substantially covers the rear side of the seatback frame 1. Further, the side surface portions 62b, 62c are formed by a plane which extends forward in the substantially perpendicular direction, and the bottom surface portion 62d is formed in an upwardly bulged shape to extend forward.

The pipe reinforcement members 42, 43 of the member pipe 40 are jointed to the upward bulged portion of the bottom surface portion 62d. More specifically, the straddle portions 42c, 43c of the pipe reinforcement members 42, 43 are jointed to the bulged portion of the bottom surface portion 62d.

A hole which engages with a back cover attachment bracket 63 is formed at the upper side of the back surface portion 62a of the back cover 62 and the vicinity of the side frame 12 (specifically, the side where the shoulder anchor portion 14 is not disposed). Further, the back cover attachment bracket 63 engages with the upper frame 13. With such a configuration, the back cover 62 may be assembled to the seatback frame 1.

In this way, the member pipe 40, which includes the bent portions 40c, 40d, 40e, and 40f and is formed in a concave shape at the position corresponding to the occupant's waist, is disposed below the seatback frame 1 of the present invention. With such a configuration, the occupant's upper body may smoothly sink into the seatback S1 without interfering with the occupant's rearward movement by the member pipe 40 at the time of rear-end collision.

In the above-described respective embodiments, a vehicle seat which is used in a front passenger seat of the automobile has been described as a specific example, but the present invention is not limited thereto. For example, the same configuration may also be, of course, applied to a vehicle driver seat and a vehicle rear seat.

TABLE OF REFERENCE CHARACTERS

| | |
|---|---|
| S | vehicle seat |
| S1 | seatback |
| S2 | seat base portion |
| S3 | headrest |
| B | seat belt |
| B1 | shoulder belt portion |
| F | seat frame |
| 1 | seatback frame |
| 2 | seat base frame |
| 3 | core member |
| 1a, 2a, 3a | cushion pad (pad member) |
| 1b, 2b, 3b | surface material |
| 11, 12 | side frame |
| 11a | closed cross-sectional structure |
| 11b | extension portion |
| 11c | hole |
| 13 | upper frame |
| 13a | side surface portion |
| 14 | shoulder anchor portion |

TABLE OF REFERENCE CHARACTERS -continued

| | |
|---|---|
| 15 | reclining device |
| 21, 23, 21' | upper seat-base side frame |
| 22, 24, 22' | lower seat-base side frame |
| 21a, 21a' | upper outer surface material |
| 21b, 21b' | edge |
| 21c, 21c' | upper frame bulged portion (upper frame reinforcement portion) |
| 21k | upper inner surface material |
| 21x, 21x' | connection portion |
| 22a, 22a' | lower outer surface material |
| 22b, 22l, 22b', 22l' | upper edge |
| 22c, 22c' | lower frame outer surface bulged portion (lower frame reinforcement portion) |
| 22d, 22e | outer surface bead |
| 22f | outer surface convex portion (lower frame reinforcement portion, convex portion) |
| 22k, 22k' | lower inner surface material |
| 22m, 22m' | lower frame inner surface bulged portion (lower frame reinforcement portion) |
| 22n, 22o | inner surface bead |
| 22p' | inner surface convex portion (lower frame reinforcement portion, convex portion) |
| 25 | upper rail |
| 26 | lower rail |
| 27 | cushion supporting member |
| 28 | seat-base-side rear frame |
| 29a, 29b | seat-base-side front frame |
| 30 | side frame reinforcement member |
| 40 | member pipe (connection member) |
| 40a, 40b | end |
| 40c, 40d, 40e, 40f | bent portion |
| 40g | center portion |
| 42, 43 | pipe reinforcement member |
| 42a, 42b, 43a, 43b | reinforcement member jointing portion |
| 42c, 43c | straddle portion |
| 43d, 43e | leg portion |
| 43f, 43g | convex portion (bead) |
| 43i | hole |
| 44, 45 | energy absorbing member |
| 44a, 44b, 45a, 45b | jointing portion |
| 45c, 45d | bent portion |
| 50 | retractor attachment bracket |
| 51 | lower connection member |
| 54 | retractor (seat device) |
| 61 | straddle member |
| 62 | back cover |
| 62a | back surface portion |
| 62b, 62c | side surface portion |
| 62d | bottom surface portion |
| 63 | back cover attachment bracket |
| 121, 123, 121' | seat-base side frame |

The invention claimed is:

1. A vehicle seat comprising:

a seatback frame including a pair of side frames and an upper frame connecting the pair of side frames to each other at an upper portions thereof;

a shoulder anchor portion provided in an upper portion of one of side frames so that a shoulder belt portion of a seat belt is inserted therethrough; and a pair of seat-base side frames disposed below the pair of side frames, wherein:

one of the seat-base side frames connected to a lower portion of the one of side frames includes a lower seat-base side frame which extends in a front to back direction and an upper seat-base side frame which is connected to an upper portion of a lower seat-base side frame, an upper frame reinforcement portion is formed along an edge shape of the upper seat-base side frame in a connection portion of the upper seat-base side frame and the lower seat-base side frame, a lower frame reinforcement portion is formed along an upper edge shape of the lower seat-base side frame in the connection portion with the lower seat-base side frame, the upper frame reinforcement portion includes an upper frame bulged portion being bulged along the edge shape, the lower frame reinforcement portion includes a lower frame bulged portion being bulged along the upper edge shape, and a width in a seat front-to-rear direction of the upper frame bulged portion is larger than a width of the lower frame bulged portion in the connection portion.

2. The vehicle seat according to claim 1, wherein:

the lower seat-base side frame includes a lower inner surface material provided at a side where an occupant seats himself/herself, and a lower outer surface material bonded to the lower inner surface material in a state facing each other, and the lower frame reinforcement portion is formed at a position where the lower outer surface material and the lower inner surface material face each other.

3. The vehicle seat according to claim 1, wherein the upper frame reinforcement portion and the lower frame reinforcement portion are formed in a continuous shape.

4. The vehicle seat according to claim 1, wherein the lower frame reinforcement portion further includes a curved convex portion disposed to be separated from the upper edge by a predetermined distance.

5. The vehicle seat according to claim 4, wherein the convex portion is curved in a shape generally parallel to a curved shape of the upper edge shape.

6. The vehicle seat according to claim 1, wherein the upper frame reinforcement portion and the lower fame reinforcement portion are formed in a continuous shape and overlap with each other in a seat right-to-left direction in the connection portion.

* * * * *